United States Patent

Michalicek et al.

[11] Patent Number: 6,028,689
[45] Date of Patent: Feb. 22, 2000

[54] MULTI-MOTION MICROMIRROR

[75] Inventors: M. Adrian Michalicek, Albuquerque, N.Mex.; Victor M. Bright, Loveland, Ohio; John H. Comtois, Albuquerque, N.Mex.

[73] Assignee: The United States of America as represented by the Secretary of the Air Force, Washington, D.C.

[21] Appl. No.: 08/788,976

[22] Filed: Jan. 24, 1997

[51] Int. Cl.⁷ .................................................. G02B 26/08
[52] U.S. Cl. ........................ 359/224; 359/223; 359/291; 359/298; 359/318; 359/872; 359/876
[58] Field of Search ..................................... 359/221, 223, 359/225, 291, 295, 298, 318, 872, 876, 224

[56] References Cited

U.S. PATENT DOCUMENTS

| | | | |
|---|---|---|---|
| 5,239,361 | 8/1993 | Burch | 359/876 |
| 5,485,304 | 1/1996 | Kaeriyama | 359/223 |
| 5,529,277 | 6/1996 | Ostaszewski | 359/223 |
| 5,535,047 | 7/1996 | Hornbeck etal. | 359/295 |

*Primary Examiner*—Cassandra Spyrou
*Assistant Examiner*—Darren E. Schuberg
*Attorney, Agent, or Firm*—Thomas C. Stover

[57] ABSTRACT

Provided is a movable micromirror assembly wherein a mirror is mounted on, e.g. four flexible support arms, which are mounted in turn on a center support post. The post and arms resiliently support such mirror over, e.g. four address electrodes. The micromirror device is actuated like a parallel-plate capacitor by applying an address potential to the electrodes, which draw a part or all of the mirror toward same, countered by the spring force of the proximate support arms. Motion of the micromirror can be achieved along two axes since the device can be tilted and retracted according to the varying potentials applied to each of the four electrodes and the attractive force applied in turn to various portions of the micromirror in spaced proximity therewith. The support system of the micromirror is positioned beneath the mirror so that no reflective service area is lost to these features. Accordingly individual micromirror assemblies can be placed close to each other, in side by side array, to maximize the active surface area of such array. Thus each such micromirror can be tilted on two axes to scan one or more fields of regard and also can simultaneously be retracted or elevated to a desired depth to remove phase aberrations in the incident image by discreetly lengthening or shortening the optical path of the image reflected therefrom.

10 Claims, 4 Drawing Sheets

MIRROR UNDER BOTH ACTUATIONS

MIRROR IN RESTING POSITION

MIRROR UNDER TILT ACTUATION

MIRROR UNDER PHASE ACTUATION

MIRROR UNDER BOTH ACTUATIONS

1

MULTI-MOTION MICROMIRROR

STATEMENT OF GOVERNMENT INTEREST

The invention described herein may be manufactured and used by or for the Government for governmental purposes without the payment of any royalty thereon.

FIELD OF THE INVENTION

This invention relates to movable mirrors, particularly multi-motion micromirrors.

BACKGROUND OF THE INVENTION

Many micromirrors are designed using any one (or combination) of only a three primary styles of operation. First, the "phase-only" piston-style device, known as the Flexure-Beam micromirror, operates such that the motion of the reflective surface is along an axis orthogonal to its plane. The reflective mirror surface is attached to several identical flexures that support the mirror uniformly around its perimeter. As a result the direction of propagation is preserved and only the phase is modified by lengthening or shortening the optical path of the incident light.

The second design is a Cantilever micromirror which is probably the most common style. The mirror of this device is attached at one end by as little as a single flexure and is deflected downward at an angle as the device is actuated. This device alters the direction of propagation of an incident beam of light and also creates a non-uniform phase-front in the reflected light due to the slanting of the mirror surface.

The final design is the Torsion-Beam micromirror which is similar to the Cantilever device with the exception that the mirror is attached by two flexures opposite each other. As a result, this device rotates along the longitudinal axis defined by these flexures. The mirror surface tilts as with the Cantilever device, but it can be tilted in two directions along both sides of the flexures rather than just one.

But all of the above mirrors are limited in movement to one or two directions and there is need and market for micromirrors that have sufficient multi-movement capability as to overcome the above prior art shortcomings.

There has now been discovered micromirrors of multi-motion that can move to multi-positions as desired, so as to alter the phase, amplitude, and/or direction of propagation of incident light.

SUMMARY OF THE INVENTION

Broadly the present invention provides a movable micromirror assembly comprising, a) a micromirror, b) a plurality of flexure arms supporting the mirror from one side thereof, c) means to pull at least a portion of the mirror against at least one of said arms to pivot and/or retract said mirror and d) means to counter-move the mirror to dispose same in a desired position.

Desirably the flexure arms emanate from a single support post near the center of and below the mirror so as to allow such mirror to deflect radially along any desired angle and/or to retract, rather than being confined to turning in one or two directions.

Also as the mirrors are supported from below on flexure arms, a plurality of such mirrors can be mounted in close array to maximize the reflective area of such array.

BRIEF DESCRIPTION OF THE DRAWINGS

The invention will become more apparent from the following detailed specification and drawings in which.

DESCRIPTION OF PREFERRED EMBODIMENTS

Figure 1:
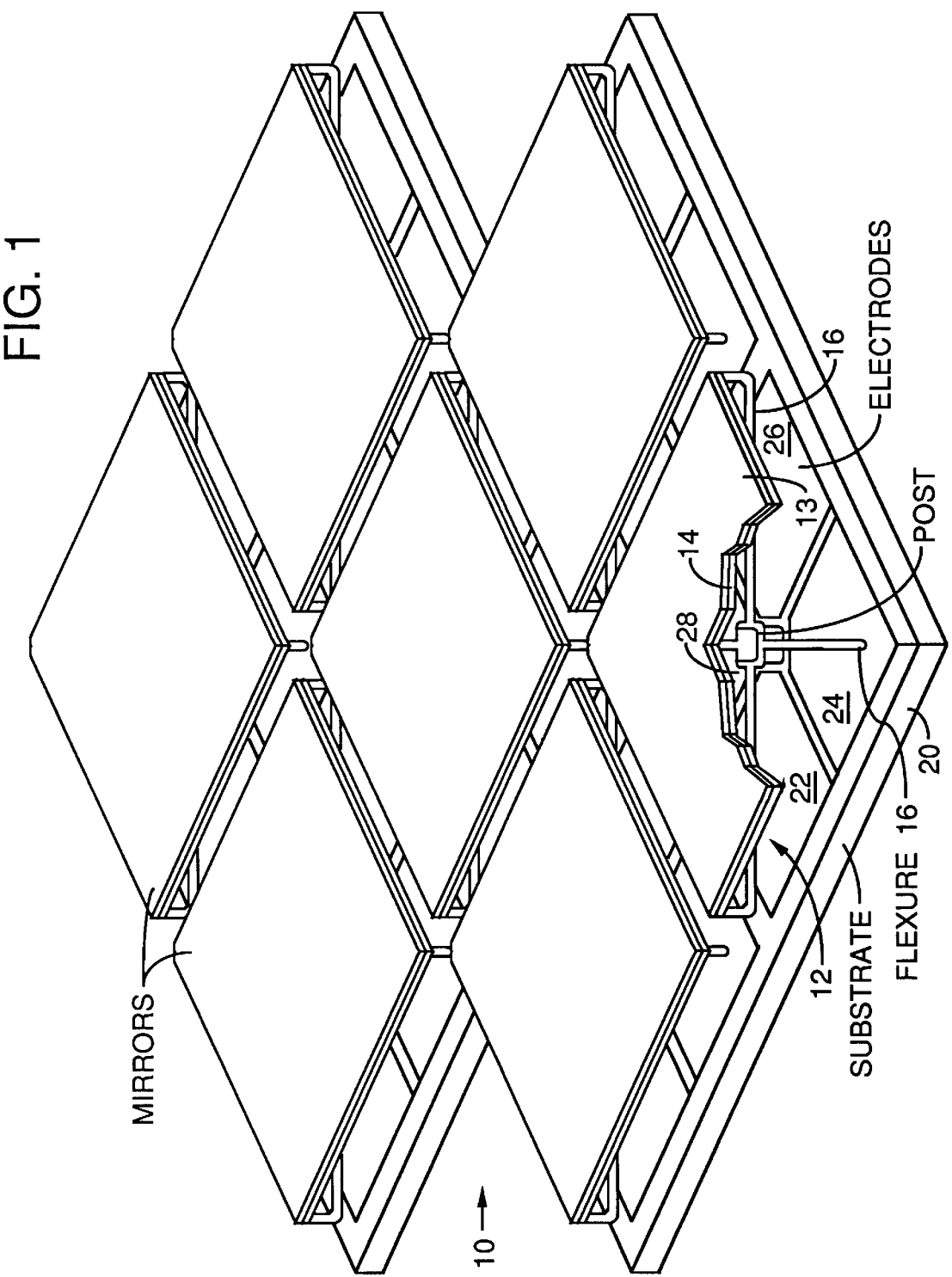
FIG. 1 is a perspective view of a plurality of the micromirrors of the invention in close array.

Referring in more detail to the drawings, the multi-motion mirror of the invention as indicated in FIGS. 1–6, includes an embodiment that can be termed a hidden flexure axial-rotation, micromirror device (ARMD). Per FIG. 1, the device 10 supports a mirror 12 having a reflective coating 13 on a substrate 20, in turn mounted on flexure arms 16, attached to a support post 18 over 4 address electrodes 22, 24, 26 and 28, as shown or indicated in FIGS. 1 and 3. The device 10 is actuated like a parallel-plate capacitor by applying an address potential to one or more of the electrodes 22–28, which creates an electrostatic force countered by the spring force of the support flexures 16. The motion of the ARMD can be achieved along two axes since the device can be tilted and deflected according to varying potentials applied to each of the four electrodes 22–28. Preferably the mirror 12 is relatively rigid and pivots and/or retracts as electrostatic force is applied to one or more of the corners thereof, as further discussed below. That is, the mirror and support assembly 11, having mirror 12 on support flexures 16 and support post 18, is shown at rest in FIG. 3.

Figure 5:
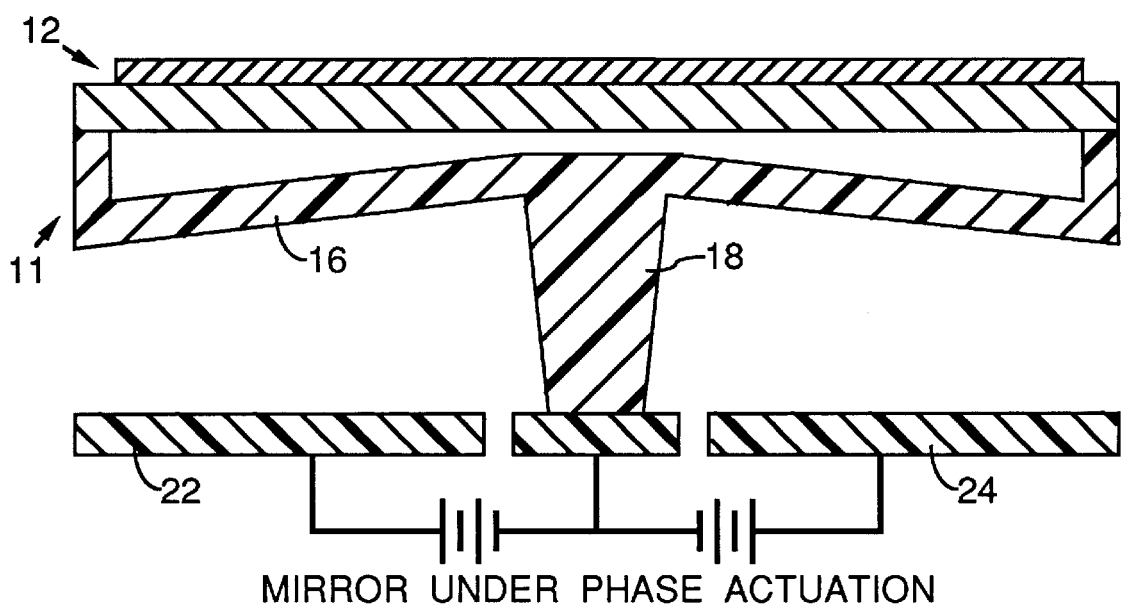

Then when electrostatic potential is applied equally to all four address electrodes, the mirror 12 retracts toward such electrodes as shown in FIG. 5.

Figure 4:
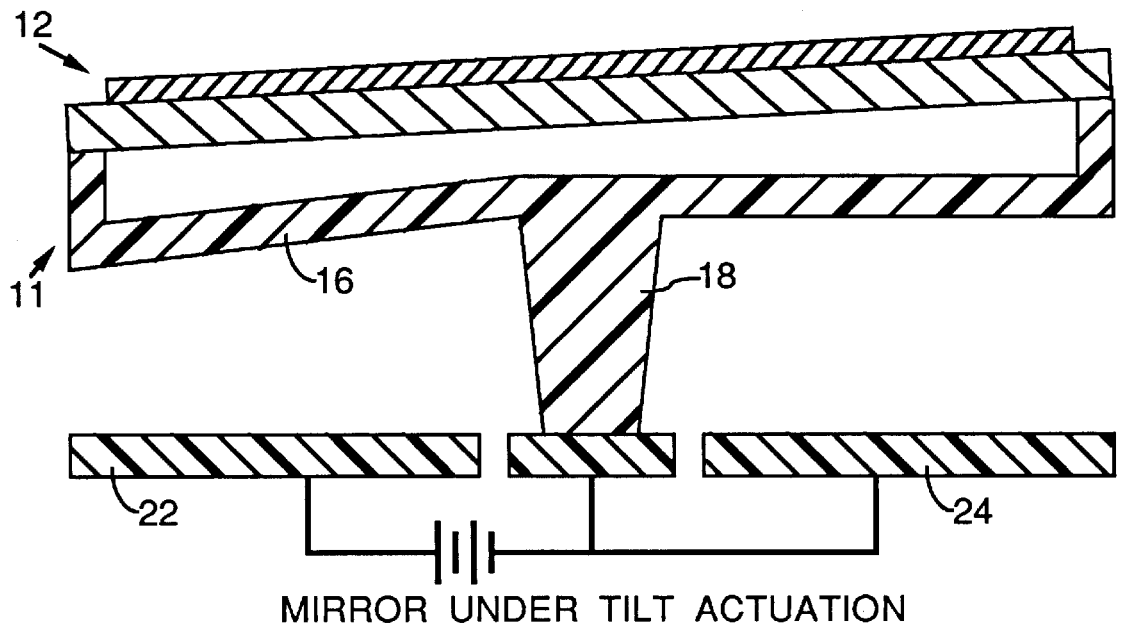
Figure 6:
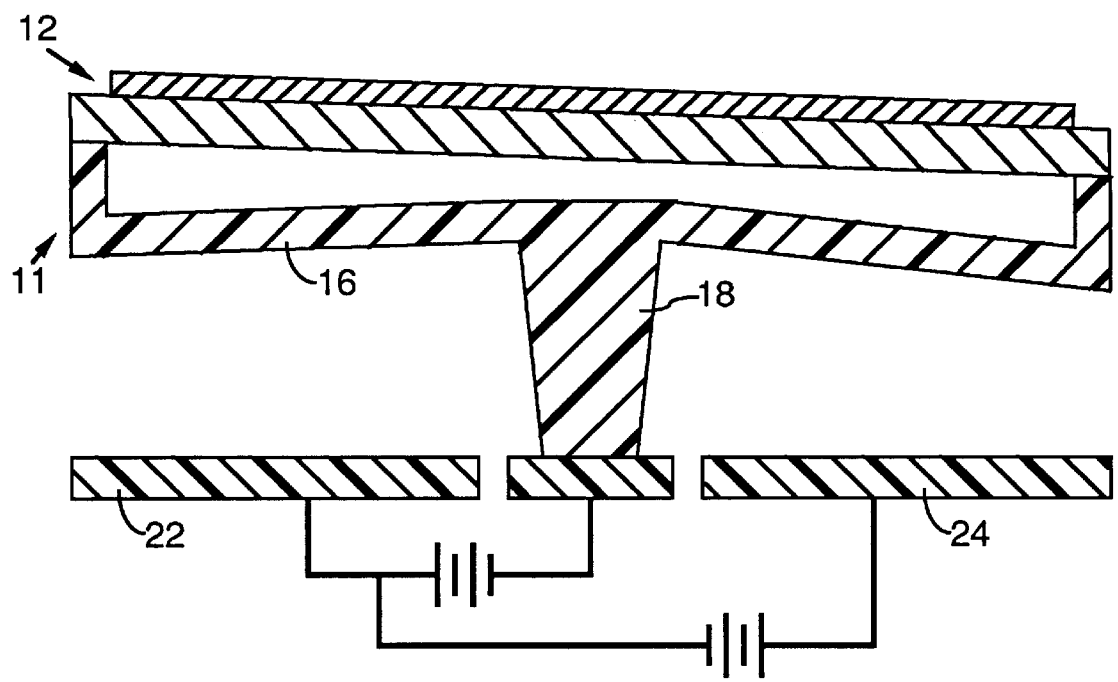

Alternatively, when electrostatic potential is applied on the left, the mirror assembly 11 tilts to the left per FIG. 4. And when such potential is applied to all four electrodes, with a bias to the right, the mirror assembly 11 both retracts and tilts to the right, as shown in FIG. 6.

Of course the above mirror retracting and tilting forces can be applied separately or in combination, to obtain a mirror position that is either retracted, tilted, or both as desired, within the scope of the present invention.

Figure 2:
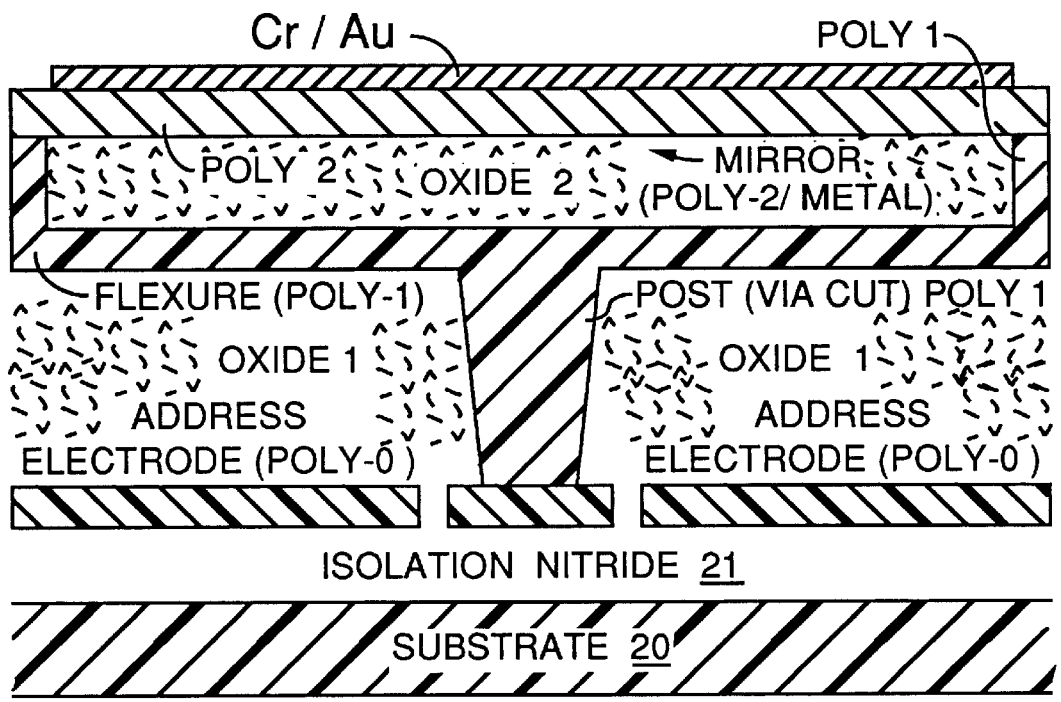
FIG. 2 is a sectional elevation schematic view of one of the micromirrors of the invention in formation and FIGS. 3–6 are elevation schematic views of a micromirror of the invention in several of its multi-positions.
Figure 3:
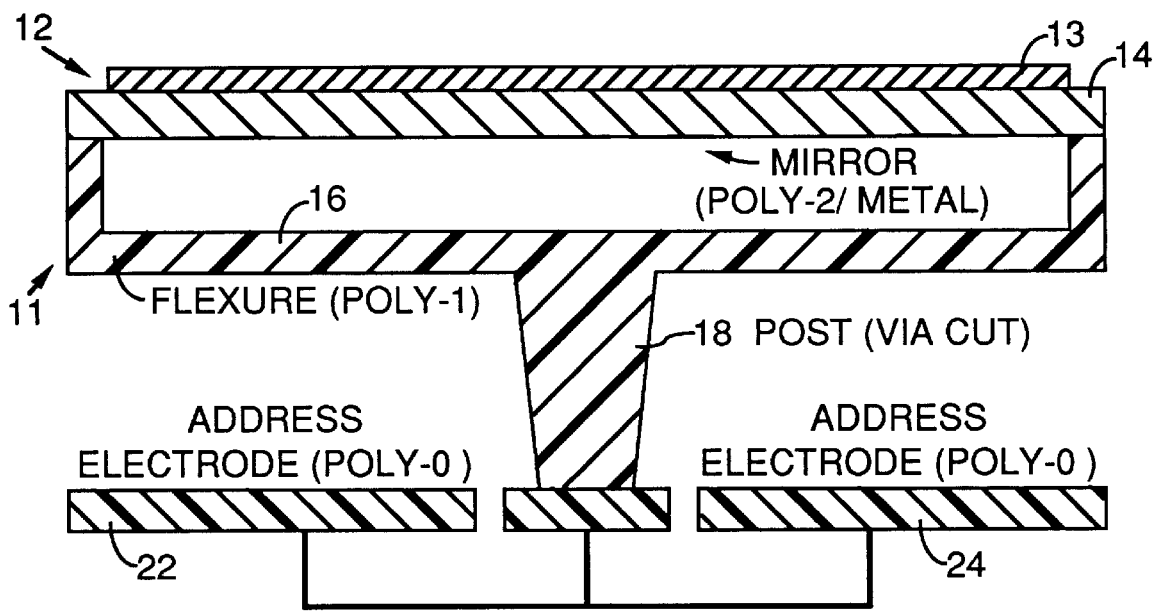

The hidden flexure ARMD can be fabricated using a three layer process. Each structural layer can be deposited, patterned and selectively removed to form the mechanical components of the device according to the design for each layer. A spacer layer of, e.g. silicon-dioxide (oxide 1 or oxide 2) can be used between each such layer for spacing and to create a moveable device once the oxide is removed to release same. A suitable fabrication process is to employ three layers of polycrystalline silicon as the structural material. As indicated in FIG. 2 hereof the address electrodes 22–28 of the device are formed in the first Poly-silicon layer, Poly-0, which is rigidly attached to the substrate 20, such substrate being previously covered by a dielectric layer 21. The central support post 18 and flexures 16 of the device, are formed in a second Poly-silicon layer, Poly-1, which is the first releasable mechanical layer. Finally, the mirror 12 is formed in the third Poly-silicon layer, Poly-2 and is coated with a reflective metal, e.g. gold, to form the reflective surface 13, on a substrate 14 of such micromirror 12, all is shown or indicated in FIGS. 2, 3 and 1 hereof. The support post 18 and flexures 16 are connected to the other Poly-silicon layers by holes that are etched in the oxide spaces so that the following structural layer will fill such holes and attach to the previous structural layer. For further information of such method, see a brochure entitled *Multi User MEMS Process (MUMPS) Introduction and Design Rules*, by MCNC Electronics Technical Division of Research, Triangle Park, N C., incorporated herein by reference.

In another example, the hidden flexure ARMD can be fabricated using a two layer micro mechanical structural process on top of a standard (CMOS) integrated circuit process.

In operation as indicated in FIGS. 1–6, the micromirror device of the invention is actuated electrostatically by applying a potential to one or more of the address electrodes, while the mirror 12 is grounded. An attractive force is applied to such mirror 12, which moves downwardly in the direction of the activated electrode, while a restoring spring force is applied by the flexures 16. Since the device 10 has, e.g. four distinct electrodes 22–28, the mirror 12 can be tilted at any angle relative to its normal position, e.g. in FIG. 3, and simultaneously be retracted a desired depth relative to its support post 18 and the electrodes, as indicated in FIG. 6.

A primary design variation of the ARMD of the invention over the three prior art designs noted above, is that a single support post is located beneath the center of the mirror 12 and permits same to deflect radially along any desired angle rather than in one direction. Further, although other designs of micromirrors tilt or deflect, none is known to do both, using distinct address electrodes and hidden flexures and support posts per the present invention.

As shown, the support post and flexures of the ARMD of the invention, are positioned beneath the mirror so that no reflective service area is lost to these features. This means that individual micromirror assemblies can be placed closer to each other in order to maximize the active reflective surface area of, e.g. a chip containing an array of the ARMDs of the invention.

In sum, a primary advantage of the multi-motion mirror of the invention is that it combines several functions desired in micromirrors. First the flexures that support the device are hidden beneath each mirror surface in order to maximize the reflective area of an array of such devices. Additionally each device can tilt along two axes as well as retract. As a result each device can scan a field of view along both vertical or horizontal axes and simultaneously retract or elevate to remove phase aberrations of an incident optical beam.

The micromirrors of the invention are desireably shaped to permit a closely packed array and can be rounded in shape but desireably are angular, eg. triangular, rectangular or have five or more sides, including hexagonal, octagonal and the like.

The micromirrors of the invention have many uses related to optical switching including, beam steering, shaping and scanning or projection applications, as well as for optical communication. For example, such micromirrors can scan a field of regard for aircraft or space vehicle plumes, in order to track same, e.g. track targets for anti-ICBM lasers. The multi-motion mirrors of the invention can scan such field of regard by breaking it into regions and scanning these regions line-by-line, since they can each tilt along two axes. Additionally, as noted above, these multi-mirrors can simultaneously retract or elevate to remove phase aberrations in the image, by discretely lengthening or shortening the optical path of the image reflected from each such micromirror device.

What is claimed is:

1. A moveable micromirror assembly comprising,
    a) a micromirror,
    b) a plurality of support flexures supporting said micromirror from underneath, said flexures being mounted on a relatively static support member,
    c) means to pull at least a portion of said micromirror against at least one of said flexures to pivot and/or retract said micromirror and
    d) means to counter-move said micromirror to dispose same in a desired position.

2. The assembly of claim 1 having a support post beneath said micromirror, said support flexures being mounted on said support post.

3. The assembly of claim 2 wherein said support flexures are flexible support arms which terminate in tips which tips support said micromirror.

4. The assembly of claim 1 having a plurality of address electrodes, at least one of which is positioned below one of said support flexures in spaced proximity therewith.

5. The assembly of claim 4, having means for grounding said micromirror and means to move said micromirror by applying electric potential to at least one of said address electrodes, which pulls said micromirror toward said electrode, against the spring force of at least one of said support flexures.

6. The micromirror of claim 5 having a plurality of corners and at least four support flexures mounted thereto from below and at least four address electrodes spaced beneath said support flexures to pivot and/or retract said micromirror in various desired directions and elevations.

7. A plurality of the micromirror of claim 6 mounted in side-by-side array.

8. A plurality of the micromirror assemblies of claim 5 mounted in side by side array to define a spatial light modulator (SLM).

9. The SLM of claim 8 wherein said micromirrors pivot on two axes to scan a field of regard, which micromirrors can also retract or elevate to discretely lengthen or shorten the optical path of an image reflected therefrom to remove phase aberrations from said image.

10. A plurality of the micromirror of claim 1 mounted in side-by-side array.

* * * * *